(No Model.) 3 Sheets—Sheet 2.
G. F. MESSINGER.
CORN SHELLER.
No. 413,532. Patented Oct. 22, 1889.
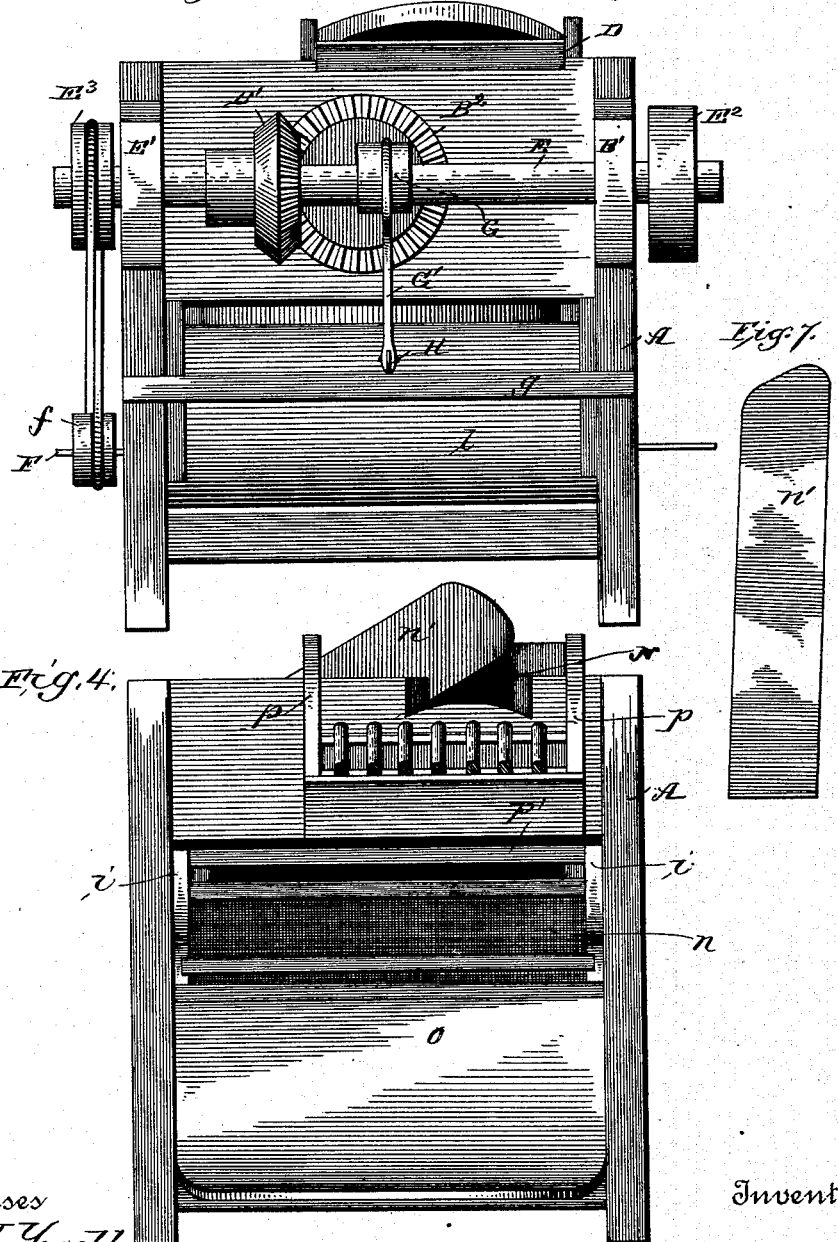
Witnesses
Edwin L. Yewell,
John Enders Jr.
Inventor
G. Frank Messinger.
By his Attorney O. E. Duffy

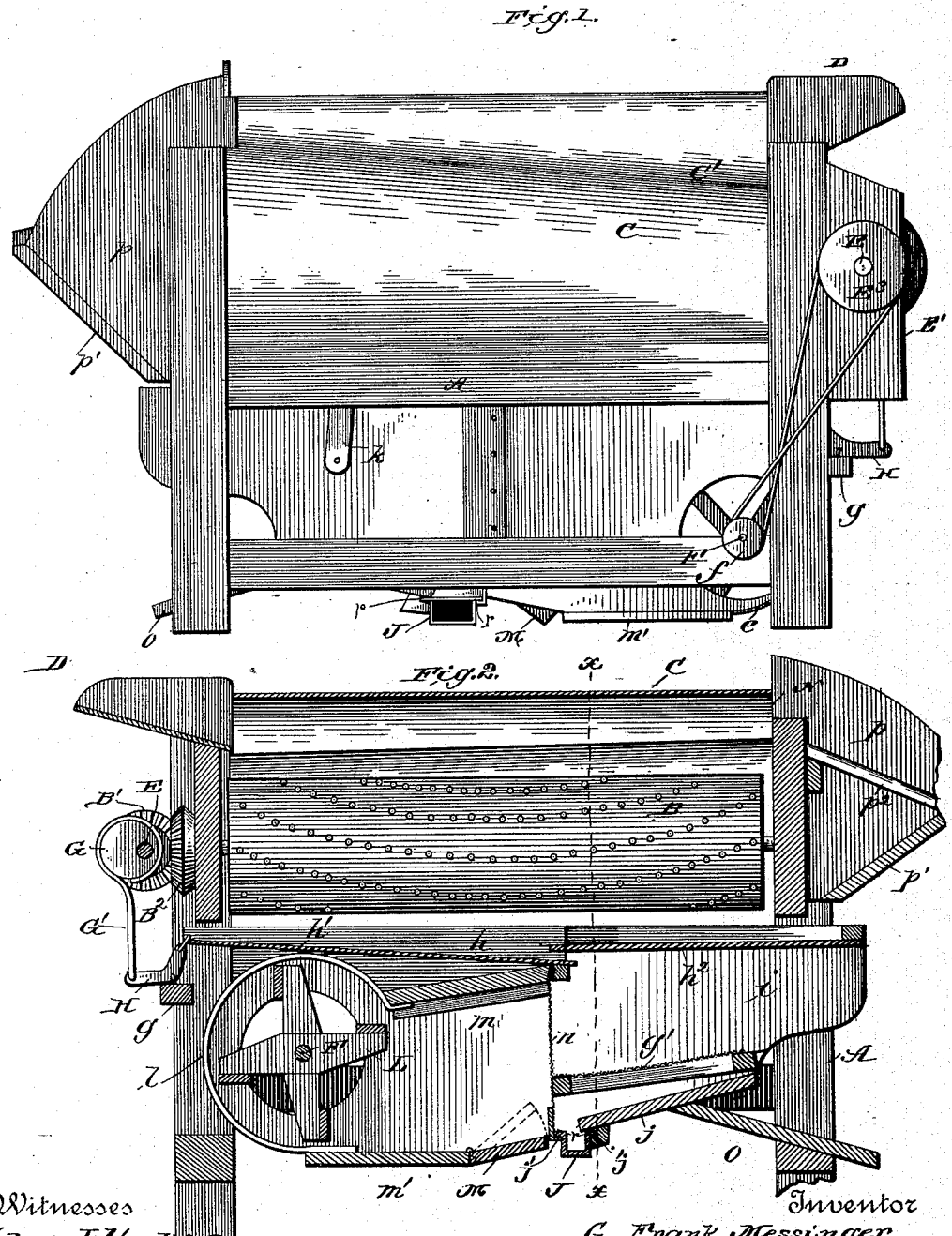

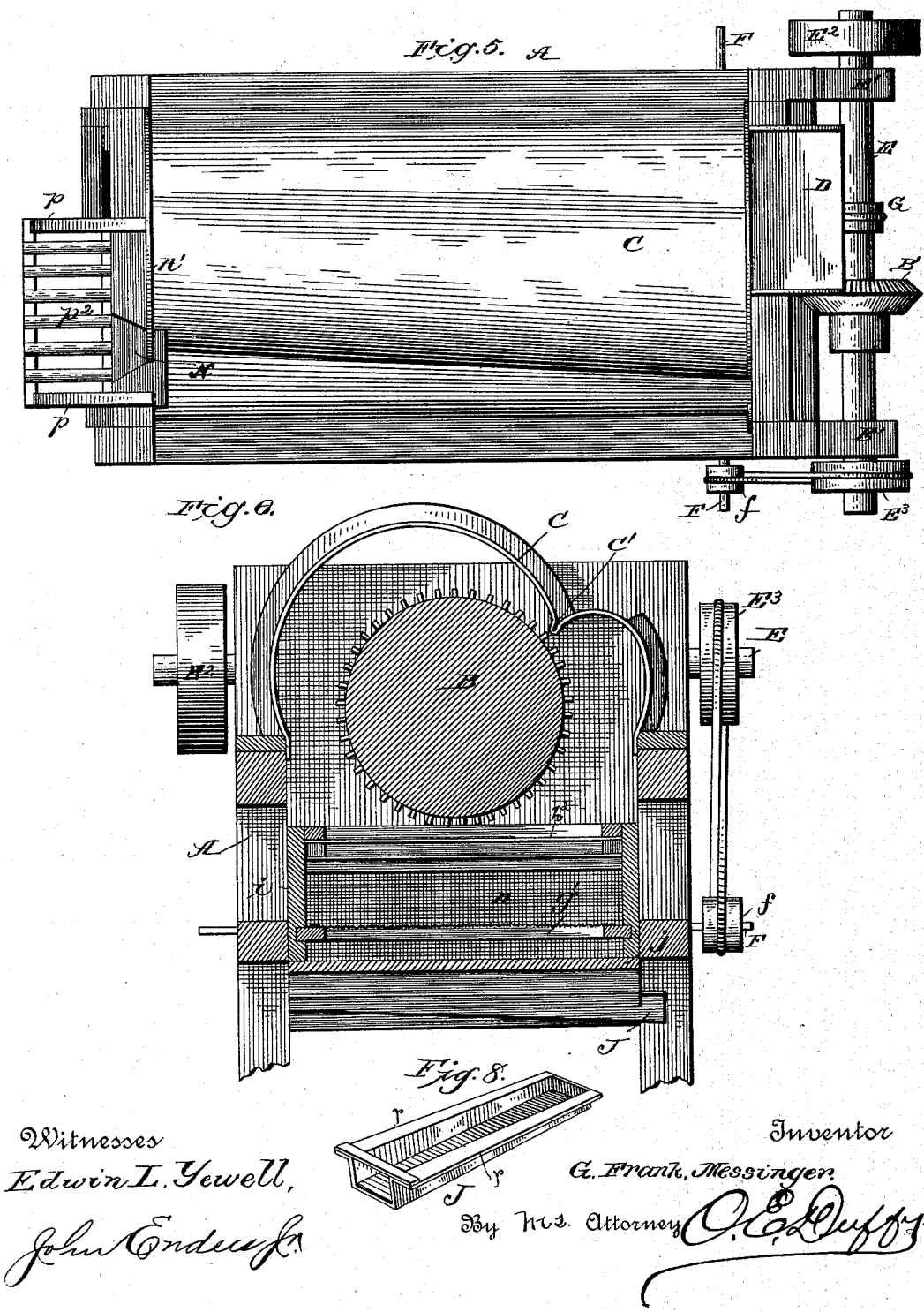

UNITED STATES PATENT OFFICE.

GEORGE FRANK MESSINGER, OF TATAMY, PENNSYLVANIA.

CORN-SHELLER.

SPECIFICATION forming part of Letters Patent No. 413,532, dated October 22, 1889.

Application filed March 14, 1888. Serial No. 267,149. (No model.)

*To all whom it may concern:*

Be it known that I, GEORGE FRANK MESSINGER, of Tatamy, in the county of Northampton and State of Pennsylvania, have invented certain new and useful Improvements in Corn-Shellers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in corn-shellers, and more particularly to that special type of corn-shellers known as "breast and cylinder."

The object of my invention is to provide an improved corn-sheller extremely simple in construction, effective in operation, and which after shelling the corn discharges the cobs at the rear of the machine, while the corn is passed into an improved cleaning-mill in the lower and rear part of the machine by which the chaff and other foreign matters are separated from the grain.

With these ends in view my invention consists in certain novel features of construction and combinations of parts, more fully described hereinafter, and particularly pointed out in the claims.

Referring to the accompanying drawings, Figure 1 represents a side elevation of the complete machine; Fig. 2, a central vertical longitudinal section of the same; Fig. 3, a front end elevation; Fig. 4, a rear end elevation; Fig. 5, a top plan; Fig. 6, a vertical cross-section on the line $x$ $x$ of Fig. 2. Fig. 7 is a detail view of the adjustable slide regulating the size of the cob-discharge opening. Fig. 8 is a detail perspective view of the removably reversible spout or conduit in the shoe.

In the drawings, the reference-letter A indicates a strong and durable supporting-frame consisting of upright end posts and cross and side sills firmly bolted or otherwise securely fastened together to withstand the jar and strain of the machine when in operation. A horizontal toothed shelling-cylinder B, constructed of any approved and well-known fashion, is provided with a central longitudinal shaft journaled in the upper end pieces of the main frame, and said shelling-cylinder revolves in, and is surrounded at its upper portion by, the usual casing C, provided, preferably, in the left-hand side with the shelling-breast or inwardly-bent crease or portion C', as clearly shown in Fig. 6. The casing covers the upper portion of the cylinder, and is secured at its lower edges to the upper-side sills of the main frame, thus leaving the lower portion of the cylinder open, while the ends are closed by the end pieces in which the cylinder-shaft is journaled. At the front end of the machine the upper part of the casing is provided with a hopper or spout D, into which the unshelled corn-cobs are fed upon the upper side of the revolving shelling-cylinder. A horizontal transverse driving-shaft E is journaled upon the outside of the front end of the main frame in, preferably, Babbitt metal journal-boxes E' E', secured to the upper portions of the upright end posts of the frame, and the ends of the transverse shaft extend beyond the sides of the frame. A driven pulley $E^2$ is secured to one end of the shaft and is adapted to impart motion to the same, and upon the opposite end a driving-pulley $E^3$ is secured, which imparts rotary motion to a fan-shaft F, transversely journaled in the lower front portion of the machine by means of a belt or the like passing around a pulley $f$ upon the end of said fan-shaft. A bevel gear-wheel B' is secured to the transverse shaft near the center thereof, and is adapted to mesh with and drive a bevel-gear $B^2$, secured to the outer front end of the cylinder driving-shaft, whereby the necessary rotary motion is imparted to the shelling-cylinder. An eccentric G is centrally secured to the transverse driving-shaft, and is provided with a downwardly-extending pitman or connecting-rod G', which is pivotally secured at its lower end to the forwardly-extending arm of a vertically-operating bell-crank lever H, pivoted at its elbow to the center of an end sill or beam $g$ of the main frame. A mill-shoe is loosely mounted in the lower part of the main frame to vibrate beneath the open portion of the shelling-cylinder, and said shoe consists of side bars or frame $h$ directly beneath the shelling-cylinder, and in the forward portion of the frame a centrally and downwardly inclined guide board or bottom $h'$ is secured between said side bars directly beneath the forward portion of the shelling-cylinder, so that the corn will fall from the shelling device upon said bottom and be guided onto the riddles or sieves of the shoe. A corresponding corn-guiding board or bottom $h^2$ is secured between the side bars of the shoe beneath the rear portion of the shelling device and is inclined downwardly and centrally, and extends a short distance beyond and above the lower end of the guide board or bottom $h'$, so that all the corn falling from the rear portions of the shelling device will be guided upon the board $h'$ and will fall from the lower edge of the same in one direction upon the riddle or sieve $g'$, secured in the lower rear portion of the shoe. The shoe is provided at its rear end with the downwardly-extending sides $i$ $i$, open at both ends, and between the lower portions of which said sieve or riddle is supported, so that the corn from the forward bottom $h'$ will fall upon the upper surface of the same. The bottom of the mill-shoe between said downwardly-extending sides is closed by a downwardly and centrally inclined guide board or bottom $j$, which guides the corn as it falls through the mill-riddle into a transverse spout or conduit J, removably located in transverse ways $j'$ $j'$ at the lower end of said last-mentioned guide-board in the bottom of the mill-shoe. Said spout, which delivers the corn from the sheller, is provided with the longitudinally-inclined bottom, so that the corn will readily flow into a measure or bagger, and the spout or conduit is closed at its upper end and open at the lower end, and is provided along its upper edge with longitudinal flanges or projections $r$ $r$, which slide in the guideways $j'$, longitudinally located upon each side of the opening between the edge of bottom $j$ and wall $n$, with the open top of the conduit beneath the edge of said bottom, whereby the conduit can be removed or inserted at will, so that its lower discharge end will be upon either side of the machine, as the ways $j'$ are open at each end, and thus can receive the flanges of the conduit from either side, whereby the "bagger" or receptacle to receive the corn can be located on either side. The mill-shoe is pivotally supported at its rear portion by hangers $k$ upon each side of the same, pivoted at their upper ends to the main frame and extending downwardly, and being pivoted to the rear sides of the mill-shoe, and at its front end the mill-shoe is supported by the bell-crank lever, to which it is centrally pivoted at the upper extending arm of the same. Thus it will be readily seen that when the transverse shaft is rotated the mill-shoe will be vibrated through the medium of the bell-crank lever and the eccentric. A fan L is located in the lower front side of the frame, beneath the forward guide board or bottom of the shoe, and said fan is operated by the fan-shaft and pulley, as before mentioned, and is inclosed by the fan-casing $l$. The blast from the fan is directed into the mill-shoe through a conduit or passage-way from the fan to the front end of the riddle, and the passage is formed by the sides of the main frame and by an upwardly-inclined board $m$ beneath the forward guiding-bottom of the shoe and forming the top of the passage, and by the cross-piece $m'$, secured to the main frame, but having a space between its rear edge and the bottom part of the shoe, which opening is closed by an adjustable wing or board M, hinged at one edge to the cross-piece $m'$ to allow its opposite edge to be raised and lowered, and thus direct the blast from the fan into the mill-shoe, as desired. The forward end of the mill-shoe, between the sides of the same and to the front of and beneath the lower end of the forward bottom $h'$, is closed by the vertical screen $n$, thus allowing the blast free access into the mill-shoe, but preventing any of the corn or other foreign substance from passing into the fan-casing, and it also prevents the corn-discharge spout from overflowing and the corn being thus wasted. The inclined bottom $j$ of the mill-shoe, beneath the mill-riddle, bears as the shoe vibrates upon the upper edge of an outwardly and downwardly inclined board $o$, which guides off the dirt and bits of cob blown from the mill-riddle through the rear open end of the shoe. As the cobs are discharged from the shelling-cyinder and casing, they pass through the outwardly-flaring discharge-opening N in the upper left-hand side of the cross-piece closing the rear end of the cylinder-casing, as shown in Figs. 4 and 5, and said cob-discharge opening can be closed or opened the desired amount by an apron or slide $n'$, so that the cobs can freely slide through the opening, but the flying corn within the casing will be prevented as much as possible from passing out with the cobs. A cob-chute is constructed beneath the cob-discharge opening, and consists of the side pieces $p$, secured to the main frame and extending upwardly upon each side of the opening, the downwardly and inwardly inclined bottom board $p'$ closing the bottom of the space between said side pieces, and the downwardly-inclined slat bottom $p^2$ extending from the discharge-opening to the upper edge of the bottom board. It will thus be seen that the corn clinging to or flying out with the discharged cobs will fall through the slatted downwardly-inclined discharge-surface upon the downwardly-inclined bottom board, and, as the bottom edge of said board extends over the rear centrally-inclined guiding-bottom of the mill-shoe, the corn from the cob-chute is discharged into said inclined bottom of the shoe and passes into the riddle. The openings between the slats of the cob-chute should be of such size as to allow the corn to pass freely through, but to allow the cobs to pass freely over the same without falling through.

The operation of the device will be clearly understood from the foregoing description and the drawings. The double corn receiving and guiding bottoms $h'$ and $h^2$ of the mill-shoe are preferably constructed of sheet metal to obviate the constant wear occasioned by the falling and rolling of the corn upon the upper surface of the same. The riddle $g'$ is located in the lower part of the mill-shoe and beneath the lower end of the corn receiving and guiding bottom $h'$. Thus it will be readily seen that the corn falling behind the upright screen $n$ in a steady stream and in one direction is more thoroughly exposed to the blast from the fan, and the corn is also exposed to the blast after falling upon the riddle or sieve, as the blast passes through the screen $n$ below the riddle and is guided upward by the inclined surface $j$ through the bottom of the riddle.

Having thus fully described my invention, what I claim, and desire to secure by Letters Patent of the United States, is—

1. In a corn-sheller, the combination of a shelling-cylinder, a casing for the same provided with a longitudinal shelling-breast in one side of its upper portion, heads closing the opposite ends of the casing, the rear head being provided with a cob-discharge aperture in its upper corner at or just above the rear end of the shelling-breast, and a straight slide between the end of the casing and its rear head and obliquely and adjustably extending across said opening, whereby the size of the same can be increased or diminished, substantially as described.

2. In a corn-sheller, the combination of the frame, the vibratory shoe in the lower portion of the same, a cross-bar at the front end of the frame, a vertical bell-crank lever mounted at its elbow on said cross-bar and having its upper arm pivoted to the front end of said shoe, a transverse driving-shaft mounted at the front end of the frame, an eccentric on said shaft, and a pitman extending down from the eccentric and loosely connected to the opposite arm of said lever, for the purpose set forth.

3. In a corn-sheller, the combination of a casing for the shelling-cylinder, having a longitudinal shelling-breast in one side of its upper portion, a head closing the rear end of the casing, having a cob-discharge opening in an upper corner at the end of said breast, a pair of vertical side pieces rigidly secured to said head on each side of and extending above and below the opening therein, a downwardly and inwardly inclined bottom rigidly secured to the lower edges of said side pieces and leaving a discharge-opening between its lower edge and the face of said head, and an outwardly-inclined open guide-bottom at its upper edge secured to the head beneath said opening and at the lower edge secured to the upper edge of said bottom board, as and for the purpose set forth.

4. In a corn-sheller, the shelling device, in combination with a vibratory shoe beneath the same consisting of side pieces, a pair of guide-bottoms carried by the side pieces beneath the shelling device and centrally and downwardly inclined and overlapping at their inner ends, the side pieces being extended downwardly at their rear ends, a downwardly and centrally inclined bottom secured to the lower edges of said extended sides, an open conduit carried by the shoe at the lower edge of said bottom, a riddle directly above said bottom and beneath the discharge-edge of said pair of guide-bottoms, and a vertical screen secured to the front edges of the said extended sides and extending from one edge of said conduit to and just in front of said discharge-edge, as and for the purpose set forth.

In testimony that I claim the foregoing as my own I affix my signature in presence of two witnesses.

G. FRANK MESSINGER.

Witnesses:
M. W. ARNER,
E. C. YEAGER.